(12) United States Patent
Chakrabarti et al.

(10) Patent No.: US 11,340,570 B2
(45) Date of Patent: May 24, 2022

(54) SYSTEM AND METHOD FOR OPERATING A WIND TURBINE

(71) Applicant: General Electric Company, Schenectady, NY (US)

(72) Inventors: Suryarghya Chakrabarti, Niskayuna, NY (US); Youngwon Shin, Niskayuna, NY (US); John Joseph Mihok, Schenectady, NY (US); Waad Hussain Subber, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 43 days.

(21) Appl. No.: 16/750,190

(22) Filed: Jan. 23, 2020

(65) Prior Publication Data
US 2021/0232109 A1    Jul. 29, 2021

(51) Int. Cl.
*G05B 19/042*    (2006.01)

(52) U.S. Cl.
CPC .... *G05B 19/042* (2013.01); *G05B 2219/2619* (2013.01)

(58) Field of Classification Search
CPC .......... G05B 19/042; G05B 2219/2619; F05B 2240/96; Y02E 10/72; F03D 17/00; F03D 80/50; F03D 7/045; F03D 7/0264; F03D 7/043
See application file for complete search history.

(56) References Cited

U.S. PATENT DOCUMENTS

| | | | |
|---|---|---|---|
| 7,322,794 B2 | 1/2008 | Lemieux et al. | |
| 7,895,016 B2 | 2/2011 | Vittal et al. | |
| 7,945,397 B2 | 5/2011 | Kar | |
| 8,924,162 B2 | 12/2014 | Lapira et al. | |
| 10,061,677 B2 | 8/2018 | Toledano | |

(Continued)

FOREIGN PATENT DOCUMENTS

| | | |
|---|---|---|
| CN | 103645052 B | 3/2016 |
| CN | 105354587 B | 9/2017 |

(Continued)

OTHER PUBLICATIONS

Bektas et al., A Neural Network Filtering Approach for Similarity-based Remaining Useful Life Estimation, The International Journal of Advanced Manufacturing Technology, vol. 101, Issue 1-4, Mar. 2019, pp. 87-103.

(Continued)

*Primary Examiner* — Thomas C Lee
*Assistant Examiner* — Charles Cai
(74) *Attorney, Agent, or Firm* — Dority & Manning, P.A.

(57) ABSTRACT

A system and method are provided for operating and maintaining a wind turbine. Accordingly, a plurality of data inputs are received. The plurality of data inputs represent a plurality of monitored attributes of a component of the wind turbine. A consolidated risk index for the component is determined using the plurality of monitored attributes, and a range of potential risk indices is forecasted. A remaining-useful-life distribution is determined based on the damage potential and an end-of-life damage threshold. The wind turbine is shut down or idled if the remaining-useful-life distribution is below a shutdown threshold.

20 Claims, 10 Drawing Sheets

(56) References Cited

U.S. PATENT DOCUMENTS

| | | | |
|---|---|---|---|
| 2003/0191606 A1* | 10/2003 | Fujiyama | G06Q 10/06 702/185 |
| 2010/0042383 A1* | 2/2010 | Shi | G01N 3/303 703/2 |
| 2010/0179773 A1 | 7/2010 | Altemark | |
| 2011/0106510 A1* | 5/2011 | Poon | G05B 23/0283 703/2 |
| 2012/0053983 A1 | 3/2012 | Vittal et al. | |
| 2013/0073223 A1 | 3/2013 | Lapira et al. | |
| 2013/0214534 A1* | 8/2013 | Nakamura | F03D 80/50 290/44 |
| 2014/0289852 A1* | 9/2014 | Evans | G06F 21/55 726/23 |

FOREIGN PATENT DOCUMENTS

| | | |
|---|---|---|
| CN | 107229269 A | 10/2017 |
| CN | 107560844 A | 1/2018 |
| CN | 106096170 B | 5/2019 |
| WO | WO 2016/023554 A1 | 2/2016 |

OTHER PUBLICATIONS

Cheng et al., Enhanced Particle Filtering for Bearing Remaining Useful Life Prediction of Wind Turbine Drivetrain Gearboxes, IEEE Transactions on Industrial Electronics, vol. 66, Issue 6, Jun. 2019, pp. 4738-4748.

Eker et al., A Similarity-Based Prognostics Approach for Remaining Useful Life Prediction, European Conference of the Prognostics and Health Management Society Jul. 8-10, 2014, Nantes, France, 5 Pages. https://www.phmsociety.org/sites/phmsociety.org/files/phm submission/2014phmce 14 011.pdf.

Mathworks, Similarity-Based Remaining Useful Life Estimation, 13 Pages. https://www.mathworks.com/help/predmaint/examples/similarity-based-remaining-useful-life-estimation.html.

Odgaard et al., Karhunen Loeve Basis Used for Detection of Gearbox Faults in A Wind Turbine, IFAC Proceedings Volumes, vol. 47, Issue 3, 2014, pp. 8891-8896.

Teng et al., Prognosis of the Remaining Useful Life of Bearings in a Wind Turbine Gearbox, Energies, 10, 32, 2017, 17 Pages. https://doi.org/10.3390/en10010032.

Wang et al., A Similarity-based Prognostics Approach for Remaining Useful Life Estimation of Engineered Systems, IEEE Explore, 2008 International Conference on Prognostics and Health Management, Dec. 2008, pp. 1-6.

European Search Report for EP Application No. 21152015.9, dated Jun. 22, 2021.

\* cited by examiner

SYSTEM AND METHOD FOR OPERATING A WIND TURBINE

FIELD

The present disclosure relates in general to wind turbines, and more particularly to systems and methods for operating wind turbines based on a forecasted range of potential risk indices.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The nacelle includes a rotor assembly coupled to the gearbox and to the generator. The rotor assembly and the gearbox are mounted on a bedplate support frame located within the nacelle. The one or more rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy and the electrical energy may be transmitted to a converter and/or a transformer housed within the tower and subsequently deployed to a utility grid. Modern wind power generation systems typically take the form of a wind farm having multiple such wind turbine generators that are operable to supply power to a transmission system providing power to an electrical grid.

Typically, wind turbines are designed to operate at a rated power output over a predetermined or anticipated operating life. For instance, a typical wind turbine may be designed for a 20-year life. In many instances, this anticipated overall operating life may be limited based on the anticipated fatigue life of one or more of the wind turbine components. Further, the operational employment of the components may result in the component wearing at a rate different than the anticipated rate. As such, component monitoring systems may be employed to detect anomalies within the various components of the wind turbine, such as the gearbox.

Typically, the component monitoring systems are configured in a diagnostic mode to detect a component failure. Because component failure may occur at any time, service actions and parts planning are typically based on prior knowledge and past field observations, rather than on quantifiable prognostics. As such, a wind farm operator will typically have two choices for maintaining the wind turbines. The operator may schedule preventative maintenance at, or in advance of, an expected lifespan for the component. This may result in a significantly increased cost due to changing out components when a service action is not warranted by the wear of the component. Alternatively, the operator may seek to delay maintenance activities. This may result in an unexpected failure of the component and a resultant shutdown of the wind turbine. Because the shutdown may be unexpected, it may be an extended shutdown due to replacement part availability or it may be necessary to maintain an excessive number of parts in inventory. Additionally, unanticipated failures of components may result in inefficient service actions at the wind farm, such as multiple visits from a ground crane, resulting in increased costs.

Thus, the art is continuously seeking new and improved systems to operate and maintain a wind turbine utilizing prognostic methods. Accordingly, the present disclosure is directed to systems and methods for controlling a wind turbine based on a forecasted remaining-useful-life distribution.

BRIEF DESCRIPTION

Aspects and advantages of the invention will be set forth in part in the following description, or may be obvious from the description, or may be learned through practice of the invention.

In one aspect, the present disclosure is directed to a method for operating a wind turbine. The method may include receiving, with a controller, a plurality of data inputs from at least one source. The plurality of data inputs may represent a plurality of monitored attributes of a component of the wind turbine. The method may also include determining, with the controller, a consolidated risk index for the component using the plurality of monitored attributes. The risk index may define a deviation from a nominal behavior of the component. The method may also include forecasting, with the controller, a range of potential risk indices progressing from the consolidated risk index over a defined plurality of component cycles. The range of potential risk indices may be correlated to a historical fleet-turbine data set and defined between and upper confidence interval and a lower confidence interval. Each potential risk index may correlate to a damage potential. The method may additionally include determining, with the controller, a remaining-useful-life distribution based on the damage potential and an end-of-life damage threshold. Further, the method may include shutting down or idling the wind turbine if the remaining-useful-life distribution is below a shutdown threshold.

In an embodiment, receiving the plurality of data inputs may also include receiving, with the controller, a plurality of time-series-data inputs from at least one sensor configured to monitor the component in operation.

In an additional embodiment, determining the consolidated risk index for the component may include down selecting, with the controller, the plurality of time-series-data inputs to establish the plurality of monitored attributes. The method may also include applying, with the controller, and upper and a lower normalcy bound to each of the plurality of monitored attributes. The upper and lower normalcy bounds may define a range of data inputs consistent with a baseline, healthy component. The upper and lower normalcy bounds may be based on the historical fleet-turbine data set. The method may also include detecting, with the controller, a departure of at least one of the monitored attributes from the range defined by the normalcy bounds. Additionally, the method may include defining, with the controller, a squared predicted error for each of the plurality of monitored attributes. The squared predicted error may reflect an amount of deviation of the respective monitored attributes from the respected normalcy bound. Further, the method may include summing, with the controller, the squared predicted error for each of the plurality of monitored attributes so as to compute the consolidated risk index for the component. A nonzero value may indicate an operation outside normalcy bounds for the component.

In an additional embodiment, the method may also include defining a risk threshold, wherein defining the risk index threshold balances an early fault detection with a possibility of false alarms. The method may also include, prior to forecasting the range of potential risk indices, detecting a crossing of the risk index threshold by the consolidated risk index for the component.

In an embodiment, forecasting the range of potential risk indices may include selecting from the historical fleet-turbine data set, a historical-risk-index data set for each of a plurality of wind turbines over a defined plurality of component cycles. The method may include determining, with the controller, an averaged fleet risk index over the defined plurality of component cycles. Additionally, the method may include determining, with the controller, a covariance of the historical-risk-index data set for each of the plurality of wind turbines relative to the averaged fleet risk index. The method may include modeling, with the controller, the range of potential risk indices for the component, such as via a Karhunen-Loeve Expansion. The method may also include determining, with the controller, a best-fit risk index progression for the component, such as via a Markov Chain Monte Carlo sampling. Additionally, the method may include determining, with the controller, a 95% confidence band for the forecast.

In an embodiment, the defined plurality of component cycles may be set to zero when the risk index for each of the plurality of wind turbines crosses a predetermined threshold.

In an embodiment, the method may also include converting, with the controller, the range of potential risk indices into the damage potential via a damage-to-risk index correlation. The damage-to-risk index correlation may be determined by performing a regression on a historical fleet-turbine failure data set. The historical fleet-turbine failure data set may depict a damage value assigned by inspection and a recorded risk index for the component at time of inspection.

In an additional embodiment, determining the remaining-useful-life distribution may also include establishing the end-of-life damage threshold based at a damage level at which a likelihood of catastrophic failure of the component or secondary damage to the wind turbine exceeds an acceptable limit. The method may include determining, with the controller, a number of predicted cycles required to reach the end-of-life damage threshold for each sample of the sampling. The method may also include combining, with the controller, the determined number of predicted cycles for each sample so as to produce a remaining-useful-life distribution between the upper and lower confidence intervals. The upper and lower confidence intervals may define a 95% confidence band.

In an embodiment, the method may also include determining, with the controller, an interpolation of component cycles to a specified time interval based on a historical operations data set for the wind turbine. The method may include forecasting, with the controller, the remaining-useful-life distribution relative to time via the ratio.

In a further embodiment, the method may also include generating, with the controller, an output table. The output table may indicate a probability of component failure over each of a plurality of time intervals.

In an embodiment, the method may include performing an inspection of the component and assigning a damage grade corresponding to an observed degree of damage of the component. The method may include providing the damage grade to the controller. Additionally, the method may include determining, with the controller, a difference between the damage grade and a forecasted damage level based on the risk index. The method may further include refining, with the controller, a model for forecasting the range of potential risk indices relative to the defined plurality of component cycles. The refinement may be based on the determined difference between the graded observed degree of damage and the forecasted damage potential based on the risk index.

In yet another embodiment, the controller may be a farm controller and the wind turbine may be one of a plurality of wind turbines of a wind farm.

In an embodiment, the method may include grouping, with the farm controller, maintenance activities for each of the wind turbines based on the remaining-useful-life distributions over specified time intervals. Additionally, the method may include generating, with the farm controller, a maintenance schedule for the wind farm. The maintenance schedule may be calculated to maximize the maintenance performed during a maintenance operation while minimizing premature maintenance operations.

In an additional embodiment, the method may include redistributing, with the farm controller, at least a portion of a power generation requirement from the wind turbine to at least one other wind turbine of the wind farm d for the wind turbine. The method may also include alternating periods of idling with periods of active power production for the wind turbine so as to reduce a number of component cycles per unit of time. Reducing the number of component cycles per unit of time may delay an approach to the shutdown threshold. Delaying the approach to the shaft on threshold may facilitate the grouping of repair activities for each of the wind turbines.

In another aspect, the present disclosure is directed to a system for operating and maintaining the wind turbine. The system may include the sensor(s) operably coupled to a component of the wind turbine so as to detect an attribute of the component. The system may also include a controller communicatively coupled to the sensor(s). The controller may include at least one processor configured to perform a plurality of operations. The plurality of operations may include receiving a plurality of data inputs from the sensor(s). The plurality of data inputs representing a plurality of monitored attributes of the component. The plurality of operations may also include determining, via a risk-index module, a risk index for the component using the plurality of monitored attributes. The risk index may define a deviation from a nominal behavior of the component. The plurality of operations may also include forecasting, via a predictive module, a range of potential risk indices progressing from the consolidated risk index over a defined plurality of component cycles. The range of potential risk indices may be correlated to a historical fleet-turbine data set and defined between and upper confidence interval and a lower confidence interval. Each potential risk index may correlate to a damage potential. The plurality of operations may include determining a remaining-useful-life distribution based on the damage potential and an end-of-life damage threshold. The plurality of operations may further include shutting down or idling the wind turbine if the remaining-useful-life distribution is below a shutdown threshold.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
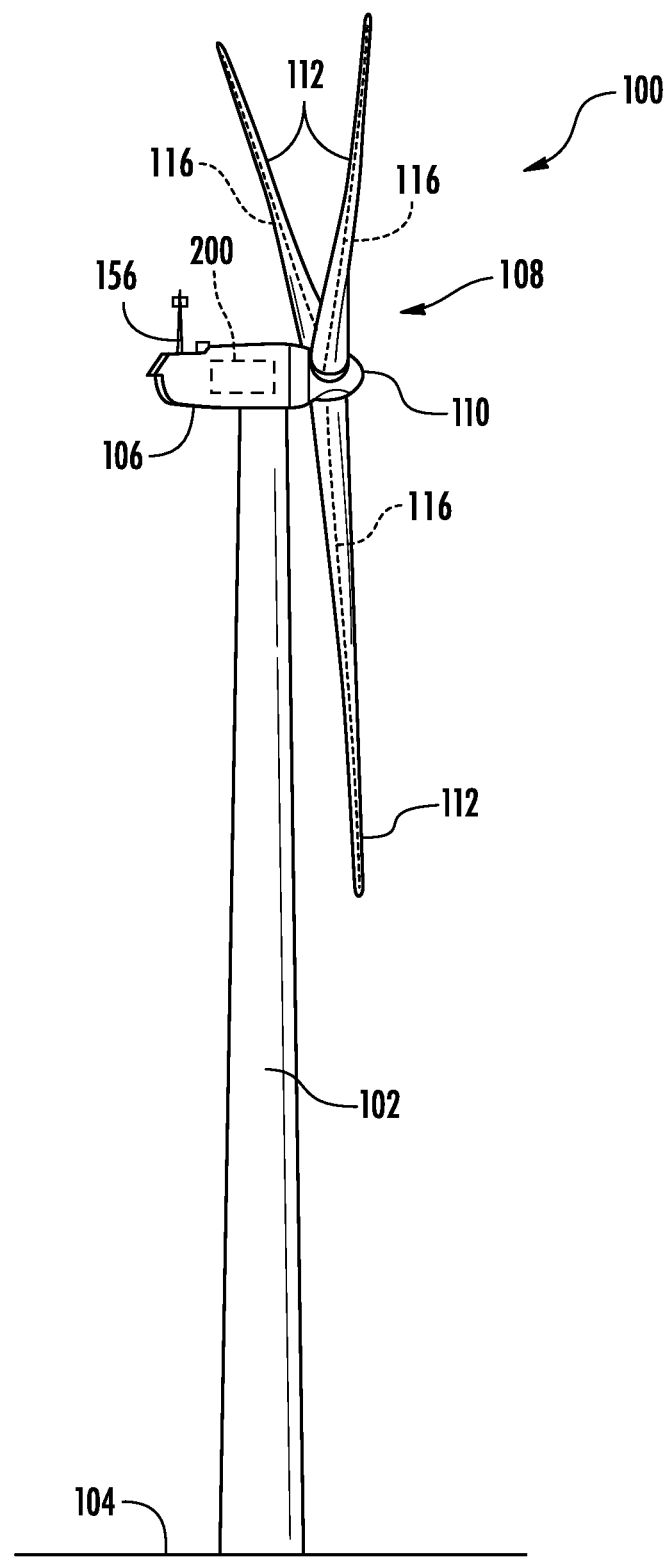
FIG. 1 illustrates a perspective view of one embodiment of a wind turbine according to the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "coupled," "attached to," and the like refer to both direct coupling, fixing, or attaching, as well as indirect coupling, or attaching through one or more intermediate components or features, unless otherwise specified herein.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Generally, the present disclosure is directed to systems and methods for operating and maintaining a wind turbine. In particular, the present disclosure may include a system and method which may predict the remaining useful life of a component once the first signs of a problem are detected. Specifically, the present disclosure may include receiving sensor information indicative of a number of attributes of the component. In some instances, the amount of information received may be quite large. This information may be filtered or down selected to establish a plurality of monitored attributes. When data is received indicating that at least one of the monitored attributes has deviated from a normalcy boundary, the deviations for each of monitored attributes may be combined to determine a consolidated risk index for the component. The risk index may define a deviation from the nominal or expected behavior of the component. A controller may utilize the risk index and a historical fleet-turbine data set to forecast a range of potential risk indices over future component cycles. Based on historical data, the range of potential risk indices may be correlated to a range of damage potentials. As such, an end-of-life damage threshold may be established and a remaining-useful-life distribution may be determined. The remaining-useful-life distribution may indicate the probability of reaching the end-of-life damage threshold within various accumulations of component cycles or time intervals.

It should be appreciated that forecasting the remaining useful life of the component may reduce unplanned maintenance due to catastrophic failures which may result from the direct failure of the component or as a consequence thereof. At the same time, the remaining-useful-life distribution may facilitate the extraction of the maximum useful life from the component by permitting the component to remain in service until a component failure is predicted. This may preclude the premature swapping of a component having a significant useful life remaining. Additionally, having a predicted failure window for the component may permit a reduction in a replacement part inventory requirement and may also reduce potential delays due to part availability in the event of an unanticipated component failure. When expanded to a wind farm level, an awareness of the predicted remaining useful life for each wind turbine of the wind farm may facilitate the consolidated scheduling of maintenance activities. For example, significant cost savings may be realized if all maintenance requiring a particular ground crane may be performed at the same time as opposed to scheduling multiple visits from the ground crane.

Referring now to the drawings, FIG. 1 illustrates a perspective view of one embodiment of a wind turbine 100 according to the present disclosure. As shown, the wind turbine 100 generally includes a tower 102 extending from a support surface 104, a nacelle 106, mounted on the tower 102, and a rotor 108 coupled to the nacelle 106. The rotor 108 includes a rotatable hub 110 and at least one rotor blade 112 coupled to and extending outwardly from the hub 110. For example, in the illustrated embodiment, the rotor 108 includes three rotor blades 112. However, in an alternative embodiment, the rotor 108 may include more or less than three rotor blades 112. Each rotor blade 112 may be spaced about the hub 110 to facilitate rotating the rotor 108 to enable kinetic energy to be transferred from the wind into usable mechanical energy, and subsequently, electrical energy. For instance, the hub 110 may be rotatably coupled to an electric generator 118 (FIG. 2) positioned within the nacelle 106 to permit electrical energy to be produced.

The wind turbine 100 may also include a controller 200 centralized within the nacelle 106. However, in other embodiments, the controller 200 may be located within any other component of the wind turbine 100 or at a location outside the wind turbine. Further, the controller 200 may be communicatively coupled to any number of the components of the wind turbine 100 in order to control the components. As such, the controller 200 may include a computer or other suitable processing unit. Thus, in several embodiments, the controller 200 may include suitable computer-readable instructions that, when implemented, configure the controller 200 to perform various different functions, such as receiving, transmitting and/or executing wind turbine control signals.

Figure 2:
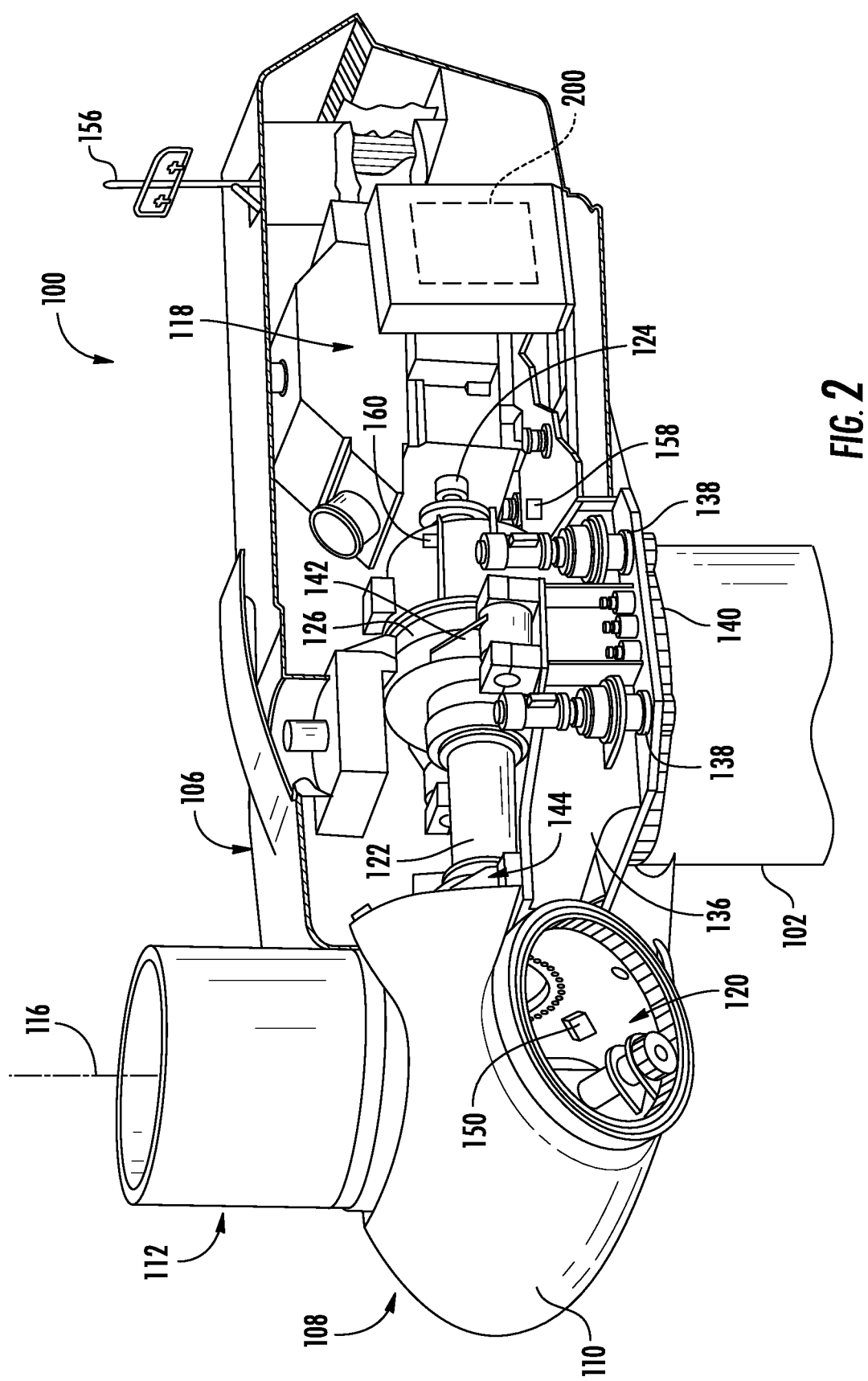
FIG. 2 illustrates a perspective, internal view of one embodiment of a nacelle of a wind turbine according to the present disclosure.

Referring now to FIG. 2, a simplified, internal view of one embodiment of the nacelle 106 of the wind turbine 100 shown in FIG. 1 is illustrated. As shown, the generator 118 may be coupled to the rotor 108 for producing electrical power from the rotational energy generated by the rotor 108. For example, as shown in the illustrated embodiment, the rotor 108 may include a rotor shaft 122 coupled to the hub 110 for rotation therewith. The rotor shaft 122 may be rotatably supported by a main bearing 144. The rotor shaft 122 may, in turn, be rotatably coupled to a high-speed shaft 124 of the generator 118 through a gearbox 126 connected to a bedplate support frame 136 by one or more torque arms 142. As is generally understood, the rotor shaft 122 may provide a low-speed, high-torque input to the gearbox 126 in response to rotation of the rotor blades 112 and the hub 110. The gearbox 126 may then be configured to convert the low-speed, high-torque input to a high-speed, low-torque output to drive the high-speed shaft 124 and, thus, the generator 118. In an embodiment, the gearbox 126 may be configured with multiple gear ratios so as to produce varying rotational speeds of the high-speed shaft for a given low-speed input, or vice versa.

Each rotor blade 112 may also include a pitch control mechanism 120 configured to rotate each rotor blade 112 about its pitch axis 116. The pitch control mechanism 120 may include a pitch controller 150 configured to receive at least one pitch setpoint command from the controller 200. Similarly, the wind turbine 100 may include one or more yaw drive mechanisms 138 communicatively coupled to the controller 200, with each yaw drive mechanism(s) 138 being configured to change the angle of the nacelle 106 relative to the wind (e.g., by engaging a yaw bearing 140 of the wind turbine 100).

Still referring to FIG. 2, one or more sensors 156, 158, 160 may be provided on the wind turbine 100 to monitor the performance of the wind turbine 100 and/or environmental conditions affecting the wind turbine 100. For example, the sensor(s) 158, 160 may be elements of a component monitoring system configured to monitor the attributes of a component of the wind turbine 100. In at least one embodiment, the component may be the gearbox 126 and the sensor(s) 158, 160 may be positioned to detect a vibration of the gearbox 126. The sensor(s) 158, 160 may include any number of sensors known to one of ordinary skill in the art, such as accelerometers, strain gauge sensors, velocity sensors, laser displacement sensors, and/or microphones. The component monitoring system may include multiple sensor(s) 158, 160 mounted at various locations on, in, or around the component to be monitored, with each sensor measuring a single attribute of the component. In an alternative embodiment, the component monitoring system may employ a reduced number of sensors and may detect attributes, such as vibrations, across a broad spectrum. The output of the sensor(s) 158, 160 may then be filtered to extract various portions of the detected spectrum which may be indicative of a particular attribute to be monitored. As a result, a single sensor(s) 158, 160 may deliver multiple data inputs to the controller 200. In at least one embodiment, the component monitoring system may deliver in excess of one hundred sensor inputs to the controller 200. It should also be appreciated that, as used herein, the term "monitor" and variations thereof indicates that the various sensors of the wind turbine 100 may be configured to provide a direct measurement of the parameters being monitored or an indirect measurement of such parameters. Thus, the sensors described herein may, for example, be used to generate signals relating to the parameter being monitored, which can then be utilized by the controller 200 to determine the condition of the wind turbine 100.

Figure 3:
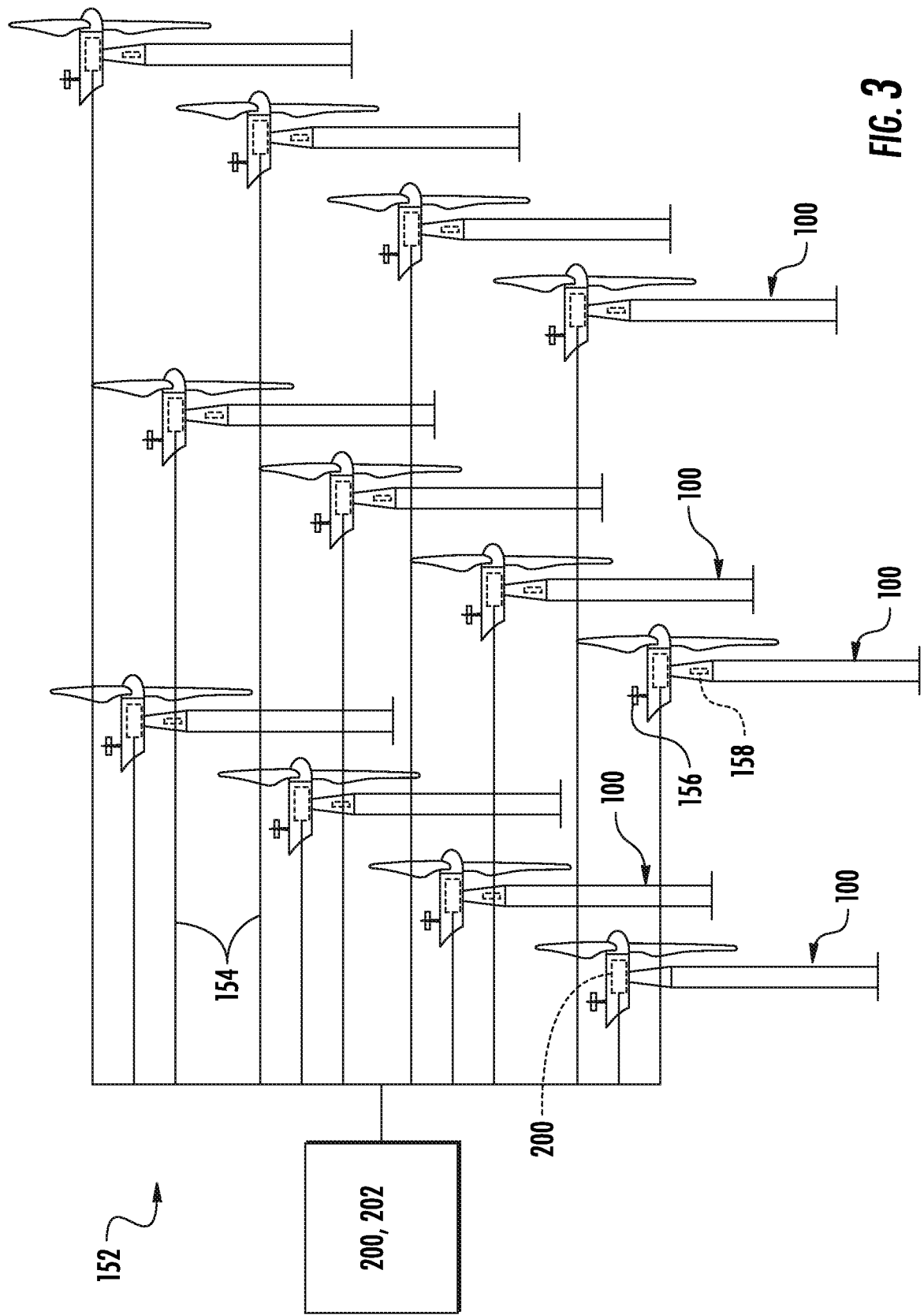
FIG. 3 illustrates a schematic diagram of one embodiment of a wind farm having a plurality of wind turbines according to the present disclosure.

Referring now to FIG. 3, a schematic view of one embodiment of a wind farm 152 controlled according to the systems and methods of the present disclosure is illustrated. As shown, the wind farm 152 may include a plurality of the wind turbines 100 described herein and a controller 200. For example, as shown in the illustrated embodiment, the wind farm 152 may include twelve wind turbines 100. However, in other embodiments, the wind farm 152 may include any other number of wind turbines 100, such as less than twelve wind turbines 100 or greater than twelve wind turbines 100. In one embodiment, the controllers 200 of the turbines 100 may be communicatively coupled to a farm controller 202 through a wired connection, such as by connecting the controllers 200 through suitable communicative links 154 (e.g., a suitable cable). Alternatively, the controllers 200 may be communicatively coupled to the farm controller 200 into through a wireless connection, such as by using any suitable wireless communications protocol known in the art. In addition, the farm controller 200 into may be generally configured similar to the controller 200 for each of the individual wind turbines 100 within the wind farm 152.

In several embodiments, the wind turbines 100 of the wind farm 152 may include one or more sensors, such as any of sensors 156, 158, 160, for monitoring various operational data of the wind turbines 100 and/or one or more wind parameters of the wind farm 152. For example, as shown, the sensors may include an environmental sensor 156 configured for gathering data indicative of at least one environmental condition. Thus, in an embodiment, the environmental sensor(s) 156 may, for example, be a wind vane, an anemometer, a lidar sensor, thermometer, barometer, or other suitable sensor. The data gathered by the environmental sensor(s) 156 may include measures of wind speed, wind direction, wind shear, wind gust, wind veer, atmospheric pressure, and/or temperature. In at least one embodiment, the environmental sensor(s) 156 may be mounted to the nacelle 106 at a location downwind of the rotor 108. It should be appreciated that the environmental sensor(s) 156 may include a network of sensors and may be positioned away from the turbine(s) 100. It should be appreciated that environmental conditions may vary significantly across a wind farm 152. Thus, the environmental sensor(s) 156 may allow for the local environmental conditions, such as local wind speed, at each wind turbine 100 to be monitored individually by the respective turbine controllers 200 and collectively by the farm controller 200.

Figure 4:
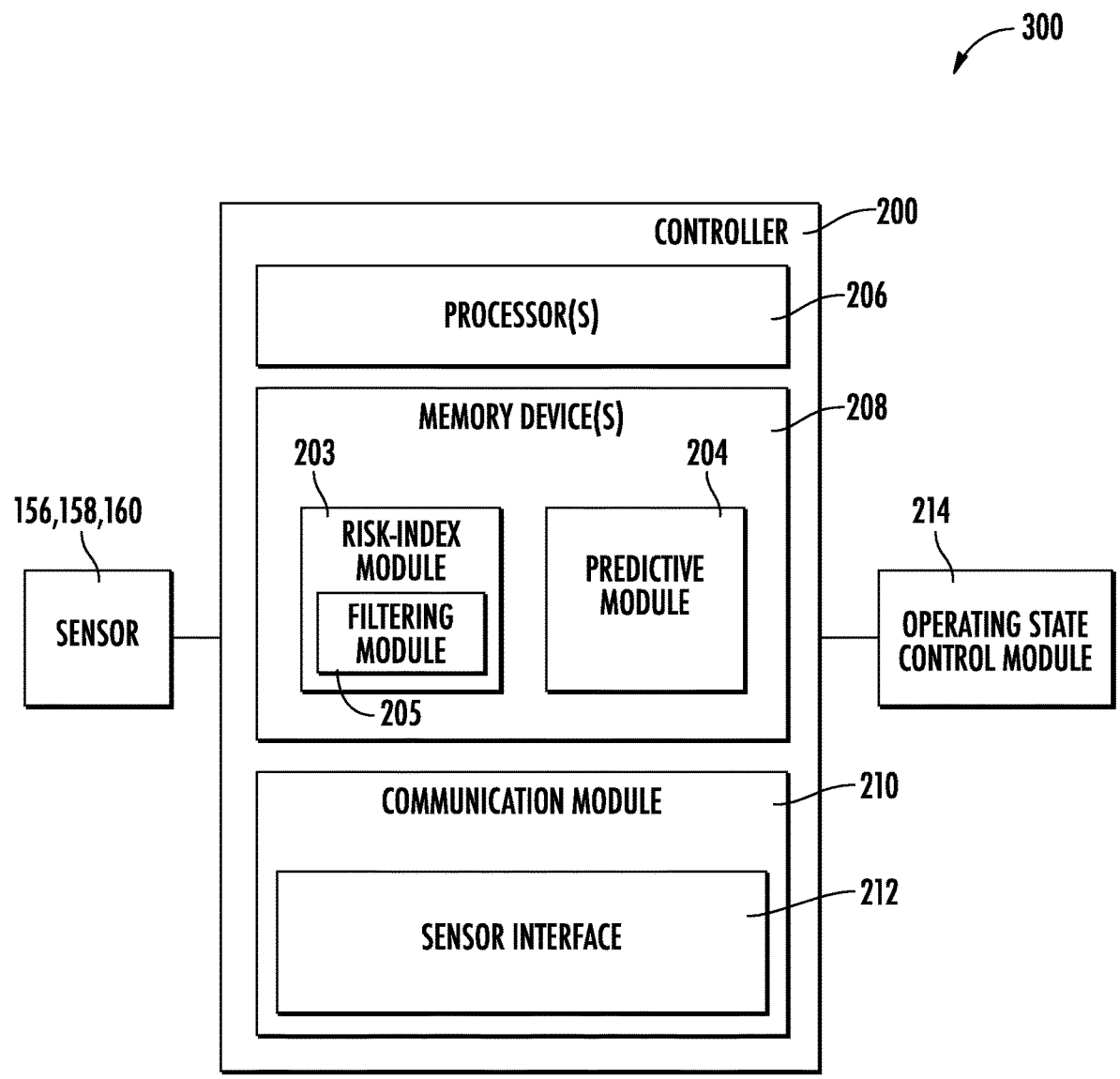
FIG. 4 illustrates a schematic diagram of one embodiment of a controller according to the present disclosure.

Referring now to FIGS. 4-10, schematic diagrams and graphical representations of multiple embodiments of a system 300 for operating and maintaining a wind turbine according to the present disclosure are presented. As shown particularly in FIG. 4, a schematic diagram of one embodiment of suitable components that may be included within the controller 200 is illustrated. For example, as shown, the controller 200 may include one or more processor(s) 206 and associated memory device(s) 208 configured to perform a variety of computer-implemented functions (e.g., performing the methods, steps, calculations and the like and storing relevant data as disclosed herein). Additionally, the controller 200 may also include a communications module 210 to facilitate communications between the controllers 200, 202 and the various components of the turbine(s) 100. Further, the communications module 210 may include a sensor interface 212 (e.g., one or more analog-to-digital converters) to permit signals transmitted from one or more sensor(s) 156, 158, 160 to be converted into signals that can be understood and processed by the processors 206. It should be appreciated that the sensors 156, 158, 160 may be communicatively coupled to the communications module 210 using any suitable means. For example, as shown in FIG. 4, the sensor(s) 156, 158, 160 are coupled to the sensor interface 212 via a wired connection. However, in other embodiments, the sensor(s) 156, 158, 160 may be coupled to the sensor interface 212 via a wireless connection, such as by using any suitable wireless communications protocol known in the art. Additionally, the communications module 210 may also be operably coupled to an operating state control module 214 configured to change at least one wind turbine operating state.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 208 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 208 may generally be configured to store suitable computer-readable instructions that, when implemented by the processor(s) 206, configure the controller 200 to perform various functions including, but not limited to, detecting an approach of the current condition to a current-dependent limit and affecting a speed of the generator 118 so as to alter a rotor-stator balance of the generator 118 such that the current-dependent limit is not exceeded and the wind turbine 100 can operate at a rated power, as described herein, as well as various other suitable computer-implemented functions.

Figure 5:
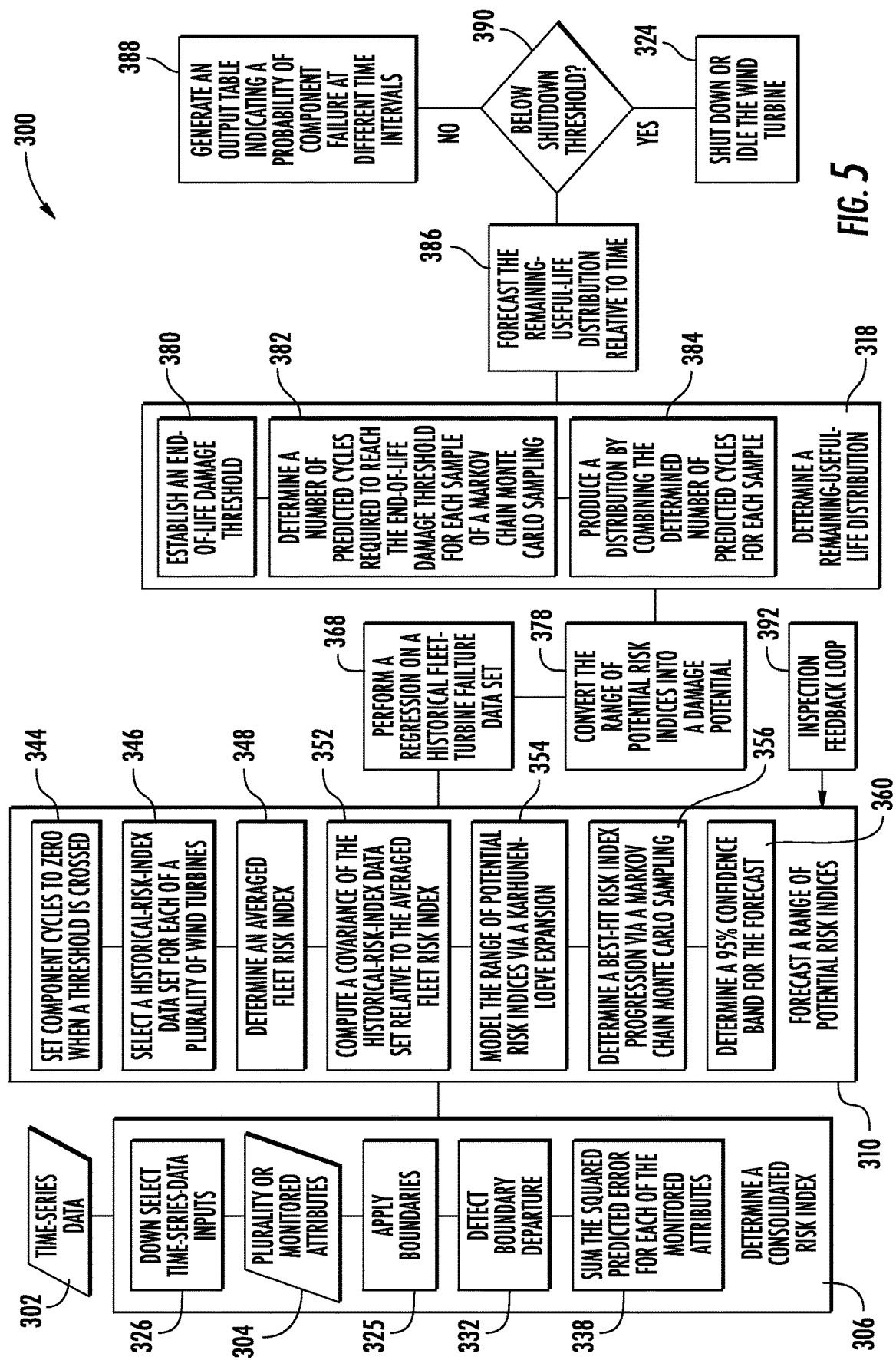
FIG. 5 illustrates a schematic diagram of one embodiment of a control logic of a system for operating and maintaining the wind turbine according to the present disclosure.

Referring particularly to FIG. 5, in an embodiment, the controller 200 of the system 300 may be configured to receive a plurality of data inputs 302 from at least one source, such as the sensor(s) 158, 160. The plurality of data inputs 302 may represent a plurality of monitored attributes 304 of a component of the wind turbine 100. The controller 200 may, at 306, determine a consolidated risk index 308 for the component using the plurality of monitored attributes 304 via a risk-index module 203. The risk index 308 may define a deviation from a nominal behavior of the component. The controller 200 may, at 310, forecast a range of potential risk indices 312 relative to a defined plurality of component cycles 314 via a predictive module 204. The range of potential risk indices 312 may be correlated to a historical fleet-turbine data set and defined between an upper confidence interval and a lower confidence interval. Each potential risk index may correlate to a damage potential 316. The controller 200 may also, at 318, determine a remaining-useful-life distribution 320 based on the damage potential 316 and an end-of-life damage threshold 322. Further, the controller 200 may, at 324, shut down or idle the wind turbine 100 if the remaining useful life distribution 320 is below a shutdown threshold.

Figure 7:
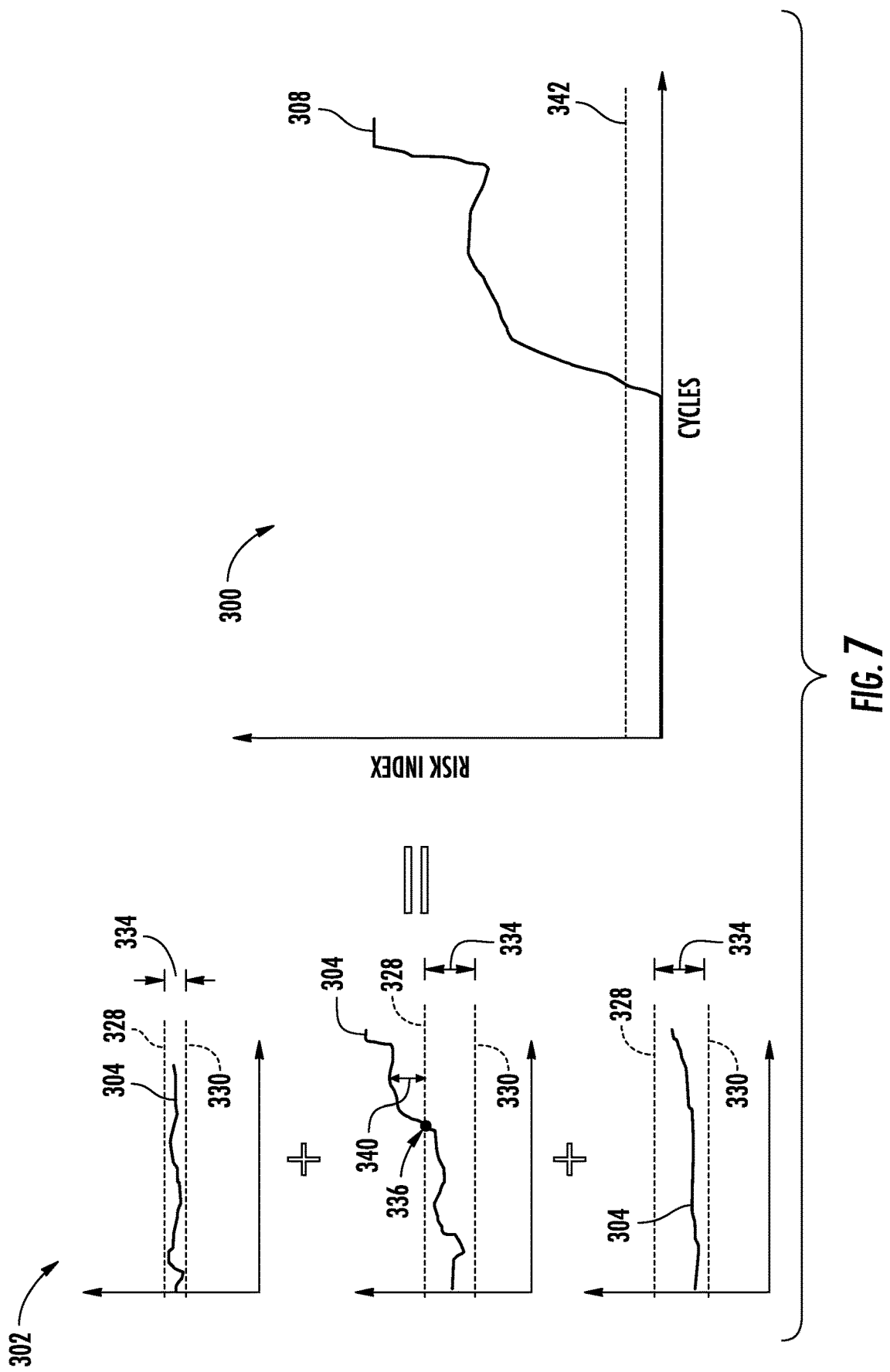
FIG. 7 illustrates a graphical representation of a portion of the control logic of FIG. 5, particularly illustrating the system determining the consolidated risk index for the component according to the present disclosure.

Referring particularly to FIGS. 5 and 7, in an embodiment, the plurality of data inputs 302 may include a plurality of time-series-data inputs from the sensor(s) 158, 160. The time-series-data input(s) 302 may include data indicative of the health of the component in operation. For example, the sensor(s) 158, 160 may be configured to detect a vibration, a velocity, and/or a temperature of the component in operation. In at least one embodiment, a number of sensors 158, 160 may be employed to detect various attributes of the component. In an additional embodiment, a reduced number of sensors 158, 160 may be employed to detect data within a broad range. This data may then the filtered or otherwise processed to provide the controller 200 with data highlighting a particular attribute of the component. For example, the output from the sensor(s) 158, 160 may be filtered so that the data inputs 302 include several narrow frequency bands, which highlight specific attributes of the component in operation.

As indicated at 326, in at least one embodiment, the controller 200 may be configured to down select the plurality of time-series-dated inputs 302 via a filtering module 205 to establish the plurality of monitored attributes 304 of the component of the wind turbine 100. In an embodiment, plurality of data inputs 302 may include in excess of 50 data inputs for each time interval. The more than 50 data inputs 302 may be down selected to 10 or fewer (e.g. 5 or less) data inputs 302. In an embodiment, the down selection may be based on historical data which indicates that a particular frequency, temperature, or other sensor output may be indicative of developing damage within the component. In at least one embodiment, the down selection may be accomplished via a data transformation to select uncorrelated data inputs 302. For example, the transformer may include a principal component analysis, and independent component analysis, or any other suitable transform.

In an embodiment, the controller 200 may, at 325, apply an upper and a lower normalcy boundary 328, 330 to each of the plurality of monitored attributes 304. The upper and lower normalcy bounds 328, 330 may define a range of data inputs 302 consistent with a baseline, healthy component. The upper and lower normalcy bounds 328, 330 may be based on the historical fleet-turbine data set. The historical fleet-turbine data set may include data derived from the correlation of forensic data concerning a replaced part with data recorded from the sensor(s) 158, 160 prior to part replacement. For example, the historical fleet-turbine data set may indicate that vibrations of a first amplitude for a specified frequency are normal for a healthy component, but that vibrations of a second amplitude for the specified frequency are indicative of component wear or other damage.

In an embodiment, the controller 200 may, at 332, detect a departure of at least one of the monitored attributes 304 from the range 334 defined by the normalcy bounds 328, 330. The monitored attributes 304 may cross one of the normalcy bounds 328, 330 at a detection point 336.

In a further embodiment, the controller 200 may define a predicted error 344 each of the plurality of monitored attributes 304. The predicted error 340 may reflect an amount of deviation of the respective monitored attribute 304 from the respective normalcy boundary 328, 330. Thus, controller 200 may, at 338, square and sum the predicted error 340 for each of the plurality of monitored attributes 304 so as to compute the consolidated risk index 308 for the component. A nonzero value for the risk index 308 may indicate an operation outside of the normalcy bounds 328, 330 for the component. Similarly, a risk index 308 of zero is an indication that the component is operating within the normalcy bounds 328, 330 with regards to the plurality of monitored attributes 304.

In at least one embodiment, the system 300 may also include a risk index threshold 342. The risk index threshold 342 may be defined to balance an early fault detection with a possibility of false alarms. Further, in an embodiment, the controller 200 may be configured to record but filter any consolidated risk index that does not cross the risk index threshold.

Figure 8:
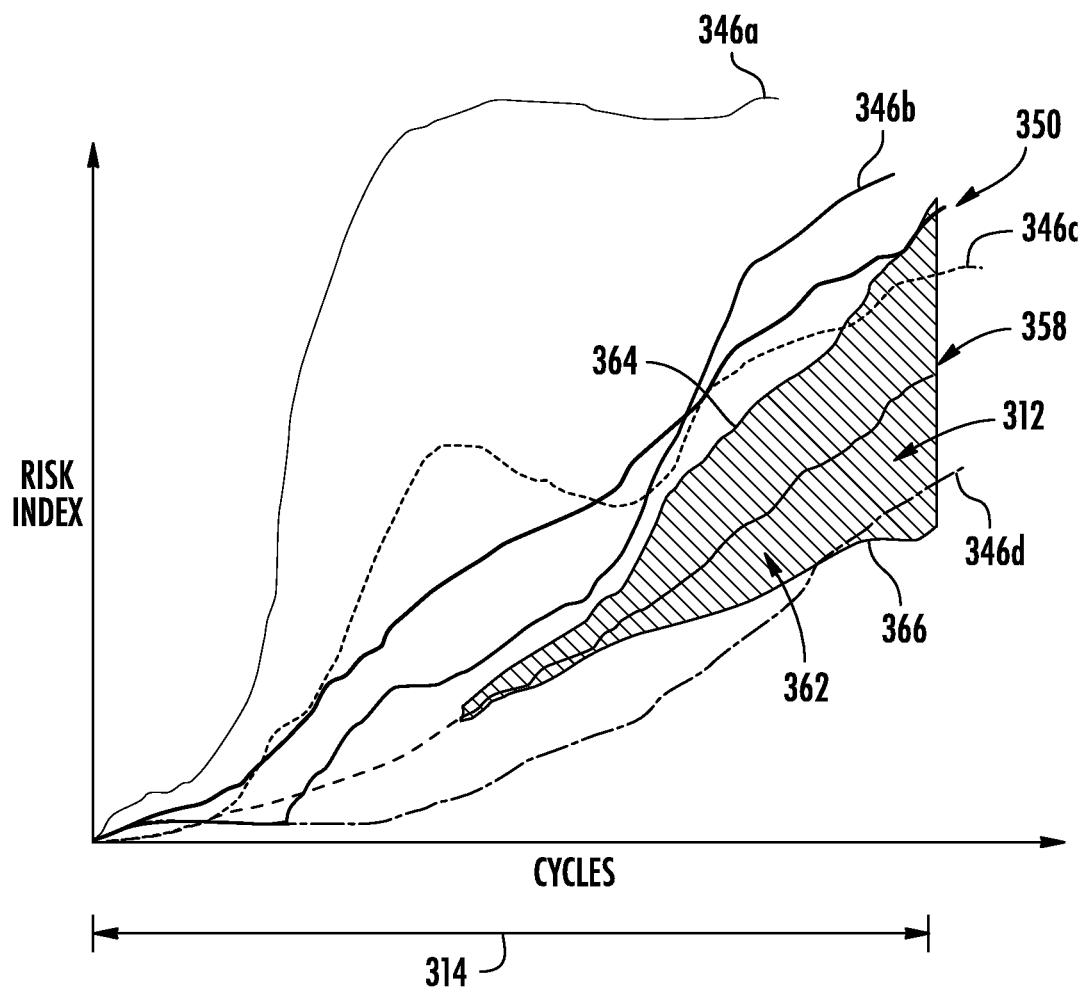
FIG. 8 illustrates a graphical representation of a forecasted range of potential risk indices according to the present disclosure.

Referring particularly to FIGS. 5 and 8, in an embodiment, the controller 200 of the system 300 may, at 310, be configured to forecast the range of potential risk indices 312 relative to the defined plurality of component cycles 314. As such, at 344, the number of component cycles recorded for the wind turbines making up the historical fleet-turbine data set are zeroed for a plurality of wind turbines 346a-d when the risk index threshold 342 is crossed. It should be appreciated that setting a cycle counter to zero when the risk index crosses the risk index threshold 342 may permit a consistent clocking of the series data from all the fleet turbines.

Referring still to 310, in an embodiment, the system 300 may include, at 346, selecting a historical-risk-index data set for each of a plurality of wind turbines 346a-d over the defined plurality of component cycles 314 from the historical fleet-turbine data set. In an embodiment, the plurality of wind turbines 346a-d may be selected by determining which of the fleet of turbines having a nonzero risk index remained operational over the defined plurality of component cycles 314. In additional embodiments, other criteria, such as turbine type, gearbox type, in-service date, etc. may also be used to down fleet-turbine data set.

Referring still to 310, the controller 200 may, at 348, compute an averaged fleet risk index 350 over the defined plurality of component cycles 314. As shown at 352, the controller 200 of the system 300 may determine a covariance of the historical-risk-index data set for each of the plurality of wind turbines 346a-d relative to the averaged fleet risk index 350.

As further depicted at 310, the controller 200 may, at 354, model the range of potential risk indices 312 for the component, e.g. via a Karhunen-Loeve Expansion or other suitable modeling or sampling approach. In such embodiments, the Karhunen-Loeve Expansion may be expressed as follows:

$$RI = \overline{RI} + \sum_{i=1}^{p} \sqrt{\lambda_i}\, \phi_i \xi_i$$

Wherein RI corresponds to a particular realization of the risk index, $\overline{RI}$ is the averaged fleet risk index 350, $\lambda$ and $\phi$ are the eigenvalues and eigenfunctions of the covariance matrix, and $\xi$ are uncorrelated random variables.

In an embodiment, the uncorrelated random variables may, at 356 be calculated by determining a best fit progression 358 via, e.g. a Markov Chain Monte Carlo sampling. It should be appreciated that the Markov Chain Monte Carlo is a technique for estimating by simulation the expectation of a statistic in a complex model. The controller 200 may also, at 360, determine a confidence band 362 for the forecast, such as a 95% confidence level. The confidence band 362 may be defined between an upper confidence interval 364 and a lower confidence interval 366. It should be appreciated that the forecasted range of potential risk indices 312 may be generated using all of the samplings and the confidence band, and that the range of potential risk indices 312 indicates an expected progression of the consolidated risk index 308 as additional cycles are accumulated through component operation. It should be further appreciated that, as the number of predicted cycles increases, the range of potential risk indices falling within the confidence band also increases.

Figure 9:
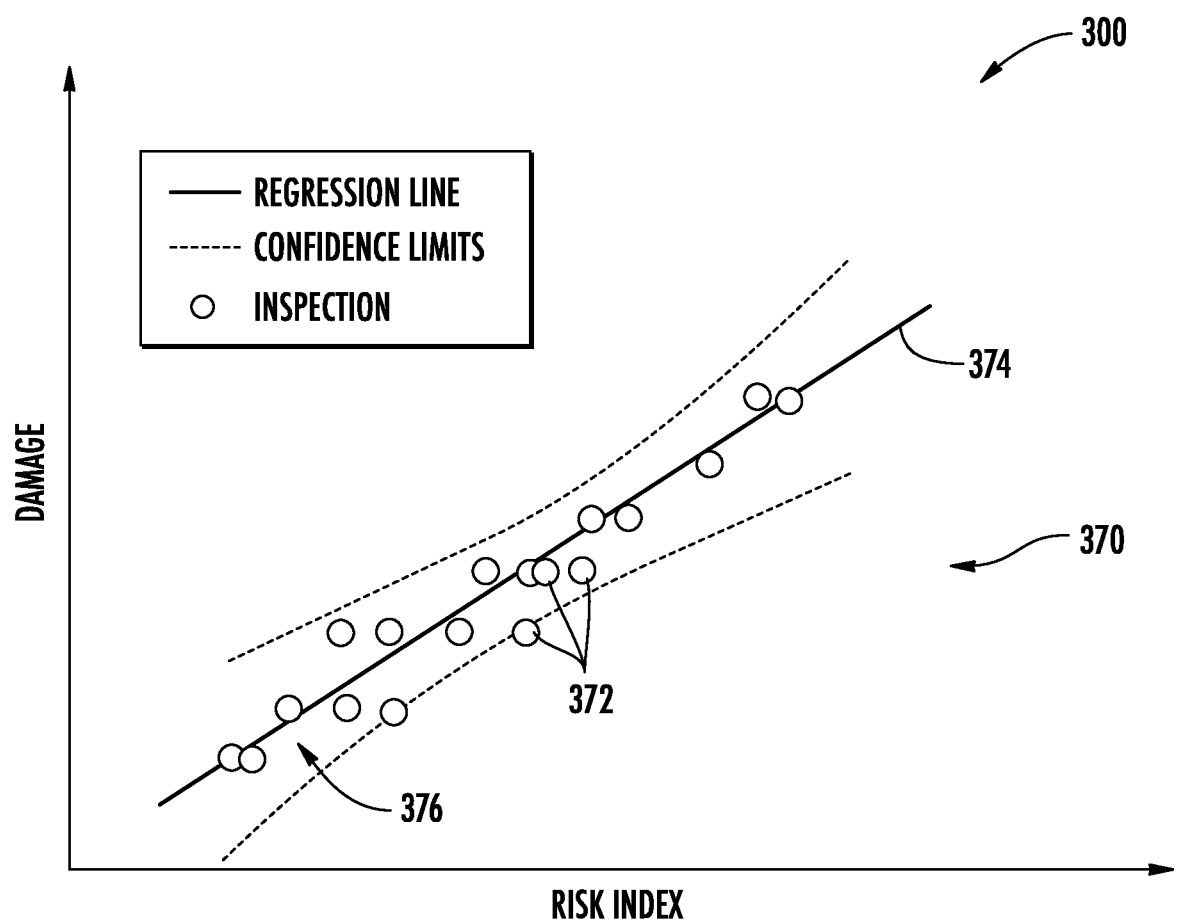
FIG. 9 illustrates a graphical representation of a correlation of component damage and risk index for the component at time of replacement according to the present disclosure.

Referring particularly to FIGS. 5 and 9, in an embodiment, the controller 200 of the system 300 may, at 368, be configured to perform a regression on the historical fleet-turbine failure data set 370. The historical fleet-turbine failure data set 370 depicts a damage value 372 assigned by inspection and a recorded risk index 308 for the component at time of inspection. This inspection may be accomplished at time of component replacement. It should be appreciated that the damage value 372 may be assigned by an operator and/or by the controller 200 using an artificial intelligence.

In an embodiment, the regression may yield a regression line 374 within a confidence boundary 376, such as 95% confidence boundary. The regression line 374 expressed as an equation may provide a damage-to-risk index correlation. The damage-to-risk index correlation may provide an indication of the expected amount of physical damage to the component at a recorded or forecasted risk index. As such, the controller 200 may, at 378 convert the range of potential risk indices into the damage potential 316 via the damage-to-risk index correlation.

Figure 10:
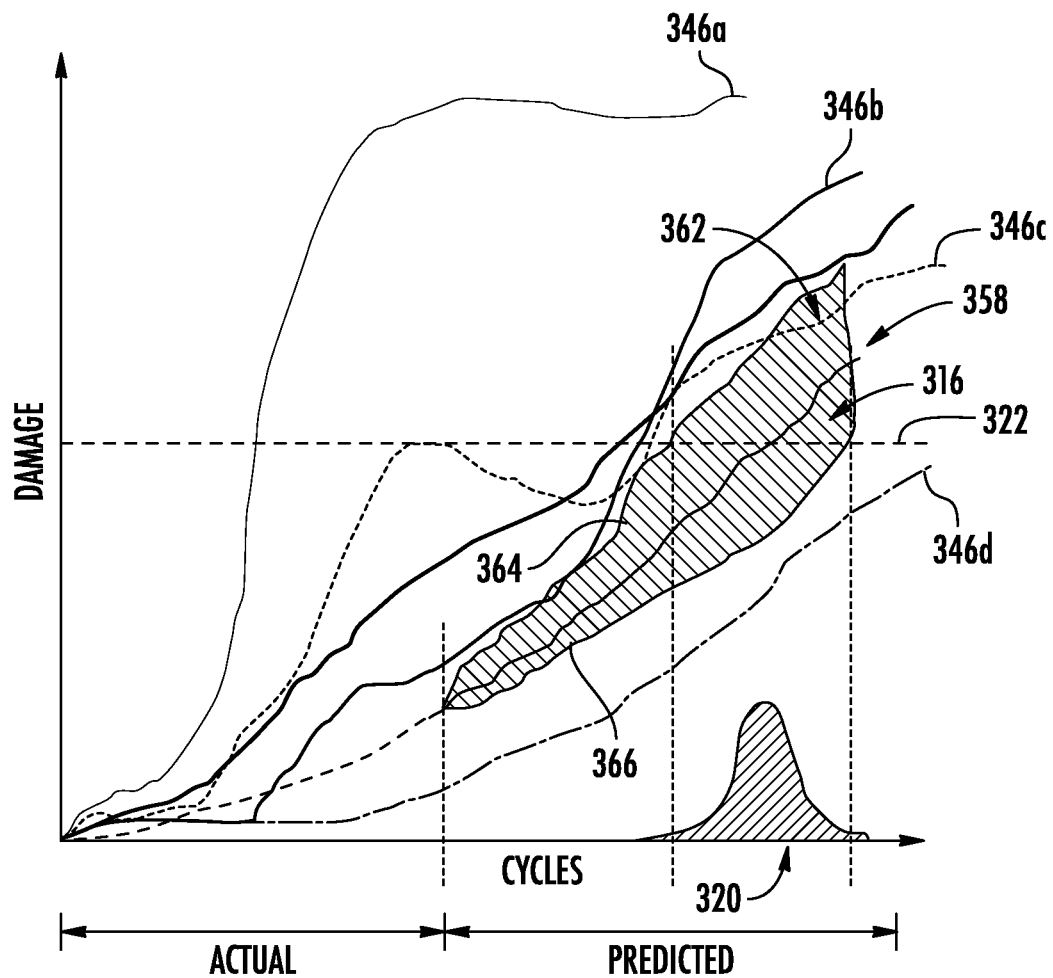
FIG. 10 illustrates a graphical representation of the remaining-useful-life distribution according to the present disclosure.

Referring particularly to FIGS. 5 and 10, in an embodiment, the controller 200 of the system 300 may be configured to determine, at 318, the remaining-useful-life distribution 320 based on the damage potential 316 and the end-of-life damage threshold 322. As such, the controller 200 may, at 380, be configured to establish the end-of-life damage threshold 322. In an embodiment, the end-of-life damage threshold 322 may be based at a damage level at which a likelihood of catastrophic failure of the component or secondary damage to the wind turbine 100 exceeds an acceptable limit. It should be appreciated that the acceptable limit may be determined by the wind turbine operator and may be at least partially dependent on the risk tolerance of the operator. For example, in an embodiment the end-of-life damage threshold 322 may be set at a damage level wherein the likelihood of catastrophic failure is greater than 50% or greater than 80%. In still further embodiments, the operator may elect to reduce the risk of catastrophic failure at the expense of more frequent component replacement by mandating that the likelihood of catastrophic failure be less than 30%.

As further depicted at 318, the controller 200 may, at 382, determine a number of predicted cycles required to reach the end-of-life damage threshold 322 for each sample of the Markov Chain Monte Carlo sampling between the upper and lower confidence intervals 364, 366 of the confidence band 362. The controller 200 may, at 384, combine the number of predicted cycles determined, at 382, to produce the remaining-useful-life distribution 320. The remaining-useful-life distribution 320 may thus indicate a probability of reaching the end-of-life damage threshold 322 within a given number of cycles. For example, in an embodiment, the remaining-useful-life distribution 320 may indicate that the probability of reaching the end-of-life threshold 322 in 10,000 cycles is less than 5%. The same remaining-useful-life distribution 320 may also indicate that there is a 50% probability of reaching the end-of-life threshold 322 in 14,000 to 16,000 component cycles. Similarly, the same remaining-useful-life distribution 320 may also indicate that the probability of not having crossed the end-of-life threshold 322 by 20,000 component cycles may be less than 5%. It should be appreciated that remaining-useful-life distribution 320 may be concentrated about the best-fit progression 358.

At 318, the remaining-useful-life distribution 320 may be expressed in a relationship to a predicted number of component cycles. However, in an embodiment, the controller 200 may, at 386, be configured to forecast the remaining-useful-life distribution 320 relative to time. As such, the controller 200 may, in an embodiment, determine an interpolation, such as a ratio, of component cycles to a specified time interval based on a historical operations-data-set for the wind turbine 100. The controller 200 may utilize the ratio to convert the remaining-useful-life distribution 320 so as to express the probability of reaching the end-of-life threshold 322 over specified time intervals. The controller 200 may, at 388, a generator an output table indicating the probability of component failure over each of the plurality of time intervals. It should be appreciated that the time intervals may be weeks, months, years, and/or any other suitable interval.

Referring still to FIG. 5, in an embodiment, the controller 200 of the system 300 may be configured to determine, at 390, whether the remaining-useful-life distribution 320 is below a shutdown threshold. The controller 200 may be configured, in an embodiment, to, at 324, shut down or idle the wind turbine 100 if the remaining-useful-life distribution 320 is below the shutdown threshold. The shutdown threshold may be determined by the operator. Being below the shutdown threshold may indicate that the component will likely reach the end-of-life damage threshold 322 more quickly than would otherwise be desirable. For example, in an embodiment, wherein the remaining-useful-life distribution 320 indicates that there is greater than 50% probability of the component reaching the end-of-life damage threshold 322 within one month, the controller 200 may shut down or idle the wind turbine 100.

Referring still to FIG. 5, in an embodiment, the system 300 may include an inspection feedback loop 392. The inspection feedback loop 392 may include performing an inspection on the component and assigning a damage grade corresponding to an observed degree of damage of the component. The damage grade may be provided to the controller 200. The controller 200 may determine a difference between the damage grade and the forecasted damage level based on the risk index. The controller 200 may be configured to refine the model for forecasting the range of potential risk indices 312 relative to the defined plurality of component cycles at 310. The refinement may be based on the determined differences between the graded observed degree of damage and the forecasted damage potential 316 based on the risk index 308. It should be appreciated that, in at least one embodiment, grading of the damage may be accomplished by the controller 200 using an artificial intelligence system.

Figure 6:
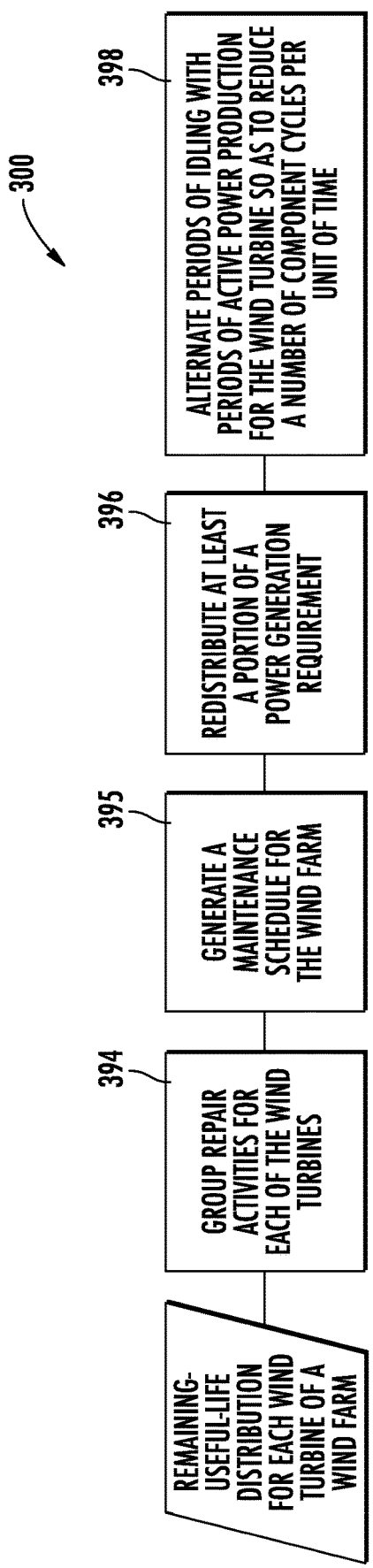
FIG. 6 illustrates a schematic diagram of another embodiment of a control logic of a system for operating and maintaining a wind farm according to the present disclosure.

As depicted in FIGS. 3, 5, and 6, the system 300 may be configured so that the farm controller 202, at 394, groups maintenance activities for each of the wind turbines 100 based on the remaining-useful-life distributions 320 for each wind turbine 100 over the specified time intervals. In such embodiments, the farm controller 202 may also be configured to generate, at 395, a maintenance schedule for the wind farm 152. The maintenance schedule may be calculated to maximize the maintenance performed during a farm-level maintenance operation while minimizing premature maintenance operations. For example, the maintenance schedule may seek to maximize the amount of maintenance performed while a ground crane or a maintenance team is on site without resorting to the premature swapping of components.

In additional embodiments, the farm controller 202 may, at 396, redistribute at least a portion of a power generation requirement from the wind turbine 100 to at least one other wind turbine of the wind farm 152. In an embodiment, redistributing at least a portion of the power generation burden may permit the generation of an idling command to the wind turbine. In an embodiment, the farm controller 202 may, at 398, alternate periods of idling with periods of active power production for the wind turbine 100 so as to reduce a number of component cycles per unit of time. It should be appreciated that reducing the number of component cycles per unit of time may delay an approach to the shutdown threshold. Delaying the approach to the shutdown threshold may, in turn, facilitate the grouping of repair activities for each of the wind turbines.

Furthermore, the skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

Clause 1. A method for operating a wind turbine, the method comprising receiving, with a controller, a plurality of data inputs from at least one source, the plurality of data inputs representing a plurality of monitored attributes of a component of the wind turbine; determining, with the controller, a consolidated risk index for the component using the plurality of monitored attributes, the risk index defining a deviation from a nominal behavior of the component; forecasting, with the controller, a range of potential risk indices progressing from the consolidated risk index over a defined plurality of component cycles, wherein each potential risk index correlates to a damage potential; determining, with the controller, a remaining-useful-life distribution based on the damage potential and an end-of-life damage threshold; and shutting down or idling the wind turbine if the remaining-useful-life distribution is below a shutdown threshold.

Clause 2. The method of any preceding claim, wherein receiving the plurality of data inputs further comprises receiving, with the controller, a plurality of time-series-data inputs from at least one sensor configured to monitor the component during operation.

Clause 3. The method of any preceding claim, wherein determining the consolidated risk index for the component further comprises: down selecting, with the controller, the plurality of time-series-data inputs to establish the plurality of monitored attributes; applying, with the controller, an upper and a lower normalcy boundary to each of the plurality of monitored attributes, the upper and lower normalcy bounds defining a range of data inputs consistent with a baseline, healthy component, the upper and lower normalcy bounds being based on a historical fleet-turbine data set; detecting, with the controller, a deviation of at least one of the monitored attributes from the range defined by the normalcy bounds; defining, with the controller, a predicted error for each of the plurality of monitored attributes, wherein the predicted error reflects an amount of deviation of the respective monitored attribute from the respective normalcy boundary; squaring, with the controller, the predicted error for each of the plurality of monitored attributes; and summing, with the controller, the squared predicted error for each of the plurality of monitored attributes so as to compute the consolidated risk index for the component, wherein a nonzero value indicates an operation outside normalcy bounds for the component.

Clause 4. The method of any preceding claim, further comprising: defining a risk index threshold, wherein defining the risk index threshold balances an early fault detection with a possibility of a false alarm; and prior to forecasting the range of potential risk indices, detecting a crossing of the risk index threshold by the consolidated risk index for the component.

Clause 5. The method of any preceding claim, wherein forecasting the range of potential risk indices further comprises selecting a historical-risk-index data set from a historical fleet-turbine data set for each of a plurality of wind turbines over a defined plurality of component cycles; determining, with the controller, an averaged fleet risk index over the defined plurality of component cycles; determining, with the controller, a covariance of the historical-risk-index data set for each of the plurality of wind turbines relative to the averaged fleet risk index; modeling, with the controller, the range of potential risk indices for the component; determining, with the controller, a best-fit risk index progression for the component; and determining, with the controller, a confidence band for the range of potential risk indices.

Clause 6. The method of any preceding claim, wherein the defined plurality of component cycles is set to zero when the risk index for each of the plurality of wind turbines crosses a predetermined threshold.

Clause 7. The method of any preceding claim, further comprising converting, with the controller, the range of potential risk indices into the damage potential via a damage-to-risk index correlation, wherein the damage-to-risk index correlation is determined by performing a regression on a historical fleet-turbine failure data set, wherein the historical fleet-turbine failure data set depicts a damage value assigned by inspection and a recorded risk index for the component at time of inspection.

Clause 8. The method of any preceding claim, wherein determining the remaining-useful-life distribution further comprises establishing the end-of-life damage threshold based at a damage level at which a likelihood of failure of the component or secondary damage to the wind turbine exceeds an acceptable limit; determining, with the controller, a number of predicted cycles required to reach the end-of-life damage threshold for each sample of a sampling; and combining, with the controller, the determined number of predicted cycles for each sample so as to produce a remaining-useful-life distribution between the upper and lower confidence intervals.

Clause 9. The method of any preceding claim, further comprising determining, with the controller, an interpolation of component cycles to a specified time interval based on a historical operations data set for the wind turbine; and forecasting, with the controller, the remaining-useful-life distribution relative to time via the ratio.

Clause 10. The method of claim 9, further comprising generating, with the controller, an output table indicating a probability of component failure over each of a plurality of time intervals.

Clause 11. The method of any preceding claim, further comprising performing an inspection of the component; assigning a damage grade corresponding to an observed degree of damage of the component; providing the damage grade to the controller; determining, with the controller, a difference between the damage grade and a forecasted damage level based on the risk index; and refining, with the controller, a model for forecasting the range of potential risk indices relative to the defined plurality of component cycles, wherein the refinement is based on the determined difference between the graded observed degree of damage and the forecasted damage potential based on the risk index.

Clause 12. The method of any preceding claim, wherein the controller is a farm controller and the wind turbine is one of a plurality of wind turbines of a wind farm.

Clause 13. The method of any preceding claim, further comprising grouping, with the farm controller, maintenance activities for each of the wind turbines based on the remaining-useful-life distributions for each of the plurality of wind turbines over specified time intervals; and generating, with the farm controller, a maintenance schedule for the wind farm.

Clause 14. The method of any preceding claim, further comprising redistributing, with the farm controller, at least a portion of a power generation requirement from the wind turbine to at least one other wind turbine of the wind farm; and alternating periods of idling with periods of active power generation for the wind turbine so as to reduce a number of component cycles per unit of time, wherein reducing the number of component cycles per unit of time delays an approach to the shutdown threshold to facilitate the grouping of repair activities for each of the wind turbines.

Clause 15. A system for operating a wind turbine, comprising at least one sensor operably coupled to a component of the wind turbine so as to detect an attribute of the component; and a controller communicatively coupled to the at least one sensor, the controller comprising at least one processor configured to perform a plurality of operations, the plurality of operations comprising receiving a plurality of data inputs from the at least one sensor, the plurality of data inputs representing a plurality of monitored attributes of the component, determining, via a risk-index module, a consolidated risk index for the component using the plurality of monitored attributes, the risk index defining a deviation from a nominal behavior of the component, forecasting, via a predictive module, a range of potential risk indices progressing from the consolidated risk index over a defined plurality of component cycles, wherein each potential risk index correlates to a damage potential, determining a remaining-useful-life distribution based on the damage potential and an end-of-life damage threshold, and shutting down or idling the wind turbine if the remaining-useful-life distribution is below a shutdown threshold.

Clause 16. The system of any preceding claim, wherein determining, via the risk-index module, the consolidated risk index for the component further comprises down selecting, via a filtering module, the plurality of time-series-data inputs to establish the plurality of monitored attributes; applying, via the filtering module, an upper and a lower normalcy boundary to each of the plurality of monitored attributes, the upper and lower normalcy bounds defining a range of data inputs consistent with a baseline, healthy component, the upper and lower normalcy bounds being based on a historical fleet-turbine data set; detecting, via the risk-index module, a departure of at least one of the monitored attributes from the range defined by the normalcy bounds; defining, via the risk-index module, a predicted error for each of the plurality of monitored attributes, wherein the predicted error reflects an amount of deviation of the respective monitored attribute from the respective normalcy boundary; squaring, via the risk-index module, the predicted error for each of the plurality of monitored attributes; and summing, via the risk-index module, the squared predicted error for each of the plurality of monitored attributes so as to compute the consolidated risk index for the component, wherein a non-zero value indicates an operation outside normalcy bounds for the component.

Clause 17. The system of any preceding claim, wherein forecasting, via the predictive module, the range of potential risk indices further comprises selecting a historical-risk-index data set from a historical fleet-turbine data set for each of the plurality of wind turbines over a defined plurality of component cycles, wherein the defined plurality of component cycles is set to zero when the risk index for each of the plurality of wind turbines crosses a predetermined threshold; determining an averaged fleet risk index over the defined plurality of component cycles; determining a covariance of the historical-risk-index data set for each of the plurality of wind turbines relative to the averaged fleet risk index; modeling the range of potential risk indices for the component; determining a best-fit risk index progression for the component; and determining a confidence band for the range of potential risk indices.

Clause 18. The system of any preceding claim, wherein the plurality of operations further comprise converting the range of potential risk indices into the damage potential via a damage-to-risk index correlation, wherein the damage-to-risk index correlation is determined by performing a regression on a historical fleet-turbine failure data set, wherein the historical fleet-turbine failure data set depicts a damage value assigned by inspection and a recorded risk index for the component at time of inspection.

Clause 19. The system of any preceding claim, wherein determining the remaining-useful-life distribution further comprises establishing the end-of-life damage threshold based at a damage level at which a likelihood of failure of the component or secondary damage to the wind turbine exceeds an acceptable limit; determining a number of predicted cycles required to reach the end-of-life damage threshold for each sample of a sampling; and combining, with the controller, the determined number of predicted cycles for each sample so as to produce a remaining-useful-life distribution between the upper and lower confidence intervals.

Clause 20. The system of any preceding claim, wherein the plurality of operations further comprise determining an interpolation of component cycles to a specified time interval based on a historical operations data set for the wind turbine; forecasting the remaining-useful-life distribution relative to time via the ratio; and generating an output table, the output table indicating a probability of component failure over each of a plurality of time intervals.

What is claimed is:

1. A method for operating a wind turbine, the method comprising:
   receiving, with a controller, a plurality of data inputs from a plurality of sensors, the plurality of data inputs representing a plurality of different monitored attributes of a plurality of components of a gearbox of the wind turbine;
   combining, with the controller, a plurality of different monitored attributes of a specific component of the plurality of components of the gearbox to compute a single consolidated risk index for the specific component for each of the plurality of components of the gearbox, each of the single consolidated risk indices defining a deviation from a nominal behavior of the specific component of the plurality of components of the gearbox;
   forecasting, with the controller, a range of potential risk indices progressing from each of the single consolidated risk indices over a defined plurality of component cycles for each of the plurality of components of the gearbox, wherein each potential risk index correlates to a damage potential;
   determining, with the controller, a remaining-useful-life distribution based on the damage potential and an end-of-life damage threshold for each of the plurality of components of the gearbox; and
   shutting down or idling the wind turbine if the remaining-useful-life distribution for at least one of the plurality of components of the gearbox is below a shutdown threshold.

2. The method of claim 1, wherein receiving the plurality of data inputs further comprises:
   receiving, with the controller, a plurality of time-series-data inputs from the plurality of sensors configured to monitor the plurality of components of the gearbox during operation.

3. The method of claim 2, further comprising:
down selecting, with the controller, the plurality of time-series-data inputs to establish the plurality of different monitored attributes;
applying, with the controller, upper and lower normalcy bounds to each of the plurality of different monitored attributes, the upper and lower normalcy bounds defining a range of data inputs consistent with a baseline, healthy component, the upper and lower normalcy bounds being based on a historical fleet-turbine data set;
detecting, with the controller, a deviation of at least one of the different monitored attributes from the range defined by the upper and lower normalcy bounds;
defining, with the controller, a predicted error for each of the plurality of different monitored attributes, wherein the predicted error reflects an amount of deviation of the respective monitored attribute from the respective normalcy bounds;
squaring, with the controller, the predicted error for each of the plurality of different monitored attributes; and
summing, with the controller, the squared predicted error for each of the plurality of different monitored attributes so as to compute the single consolidated risk indices for the plurality of components of the gearbox, wherein a nonzero value indicates an operation outside the upper and lower normalcy bounds for one or more of the plurality of components.

4. The method of claim 3, further comprising:
defining a risk index threshold, wherein defining the risk index threshold balances an early fault detection with a possibility of a false alarm; and
prior to forecasting the range of potential risk indices, detecting a crossing of the risk index threshold by the single consolidated risk index for each of the plurality of components of the gearbox.

5. The method of claim 1, wherein forecasting the range of potential risk indices further comprises:
selecting a historical-risk-index data set from a historical fleet-turbine data set for each of a plurality of wind turbines over a defined plurality of component cycles;
determining, with the controller, an averaged fleet risk index over the defined plurality of component cycles;
determining, with the controller, a covariance of the historical-risk-index data set for each of the plurality of wind turbines relative to the averaged fleet risk index;
modeling, with the controller, the range of potential risk indices for each of the plurality of components of the gearbox;
determining, with the controller, a best-fit risk index progression for each of the plurality of components of the gearbox; and
determining, with the controller, a confidence band for the range of potential risk indices.

6. The method of claim 5, wherein the defined plurality of component cycles is set to zero when the risk index for each of the plurality of wind turbines crosses a predetermined threshold.

7. The method of claim 1, further comprising:
converting, with the controller, the range of potential risk indices into the damage potential via a damage-to-risk index correlation, wherein the damage-to-risk index correlation is determined by performing a regression on a historical fleet-turbine failure data set, wherein the historical fleet-turbine failure data set depicts a damage value assigned by inspection and a recorded risk index for the component at time of inspection.

8. The method of claim 1, wherein determining the remaining-useful-life distribution further comprises:
establishing the end-of-life damage threshold based at a damage level at which a likelihood of failure of each of the plurality of components of the gearbox or secondary damage to the wind turbine exceeds an acceptable limit;
determining, with the controller, a number of predicted cycles required to reach the end-of-life damage threshold for each sample of a sampling; and
combining, with the controller, the determined number of predicted cycles for each sample so as to produce a remaining-useful-life distribution between an upper confidence interval and a lower confidence interval defining a confidence band.

9. The method of claim 1, further comprising:
determining, with the controller, an interpolation of component cycles to a specified time interval based on a historical operations data set for the wind turbine; and
forecasting, with the controller, the remaining-useful-life distribution relative to time via the ratio.

10. The method of claim 9, further comprising:
generating, with the controller, an output table indicating a probability of component failure over each of a plurality of time intervals.

11. The method of claim 1, further comprising:
performing an inspection of each of the plurality of components of the gearbox;
assigning a damage grade corresponding to an observed degree of damage of each of the plurality of components of the gearbox;
providing the damage grade to the controller;
determining, with the controller, a difference between the damage grade and a forecasted damage level based on the risk index; and
refining, with the controller, a model for forecasting the range of potential risk indices relative to the defined plurality of component cycles, wherein the refinement is based on the determined difference between the graded observed degree of damage and the forecasted damage potential based on the risk index.

12. The method of claim 1, wherein the controller is a farm controller and the wind turbine is one of a plurality of wind turbines of a wind farm.

13. The method of claim 12, further comprising:
grouping, with the farm controller, maintenance activities for each of the wind turbines based on the remaining-useful-life distributions for each of the plurality of wind turbines over specified time intervals; and
generating, with the farm controller, a maintenance schedule for the wind farm.

14. The method of claim 13, further comprising:
redistributing, with the farm controller, at least a portion of a power generation requirement from the wind turbine to at least one other wind turbine of the wind farm; and
alternating periods of idling with periods of active power generation for the wind turbine so as to reduce a number of component cycles per unit of time, wherein reducing the number of component cycles per unit of time delays an approach to the shutdown threshold to facilitate the grouping of repair activities for each of the wind turbines.

15. A system for operating a wind turbine, comprising:
a plurality of sensors operably coupled to a plurality of components of a gearbox of the wind turbine so as to detect an attribute of the plurality of components component; and
a controller communicatively coupled to the plurality of sensors, the controller comprising at least one processor configured to perform a plurality of operations, the plurality of operations comprising:
receiving a plurality of data inputs from the plurality of sensors, the plurality of data inputs representing a plurality of different monitored attributes of each of the plurality of components of the gearbox,
combining, via a risk-index module, each of the different monitored attributes of a specific component of the plurality of components of the gearbox to compute a single consolidated risk index for the specific component for each of the plurality of components of the gearbox, each of the single consolidated risk indices defining a deviation from a nominal behavior of the specific component of the plurality of components of the gearbox,
forecasting, via a predictive module, a range of potential risk indices progressing from each of the single consolidated risk indices over a defined plurality of component cycles for each of the plurality of components of the gearbox, wherein each potential risk index correlates to a damage potential,
determining a remaining-useful-life distribution based on the damage potential and an end-of-life damage threshold for each of the plurality of components of the gearbox, and
shutting down or idling the wind turbine if the remaining-useful-life distribution for at least one of the plurality of components of the gearbox is below a shutdown threshold.

16. The system of claim 15, wherein the plurality of operations further comprise:
receiving a plurality of time-series-data inputs from the plurality of sensors configured to monitor the plurality of components of the gearbox during operation;
down selecting, via a filtering module, the plurality of time-series-data inputs to establish the plurality of different monitored attributes;
applying, via the filtering module, upper and lower normalcy bounds to each of the plurality of different monitored attributes, the upper and lower normalcy bounds defining a range of data inputs consistent with a baseline, healthy component, the upper and lower normalcy bounds being based on a historical fleet-turbine data set;
detecting, via the risk-index module, a departure of at least one of the different monitored attributes from the range defined by the upper and lower normalcy bounds;
defining, via the risk-index module, a predicted error for each of the plurality of different monitored attributes, wherein the predicted error reflects an amount of deviation of the respective monitored attribute from the respective normalcy bounds;
squaring, via the risk-index module, the predicted error for each of the plurality of different monitored attributes; and
summing, via the risk-index module, the squared predicted error for each of the plurality of different monitored attributes so as to compute the consolidated risk index for each of the plurality of components of the gearbox, wherein a nonzero value indicates an operation outside normalcy bounds for each of the plurality of components of the gearbox.

17. The system of claim 15, wherein forecasting, via the predictive module, the range of potential risk indices further comprises:
selecting a historical-risk-index data set from a historical fleet-turbine data set for each of the plurality of wind turbines over a defined plurality of component cycles, wherein the defined plurality of component cycles is set to zero when the risk index for each of the plurality of wind turbines crosses a predetermined threshold;
determining an averaged fleet risk index over the defined plurality of component cycles;
determining a covariance of the historical-risk-index data set for each of the plurality of wind turbines relative to the averaged fleet risk index;
modeling the range of potential risk indices for each of the plurality of components of the gearbox;
determining a best-fit risk index progression for each of the plurality of components of the gearbox; and
determining a confidence band for the range of potential risk indices.

18. The system of claim 15, wherein the plurality of operations further comprise:
converting the range of potential risk indices into the damage potential via a damage-to-risk index correlation, wherein the damage-to-risk index correlation is determined by performing a regression on a historical fleet-turbine failure data set, wherein the historical fleet-turbine failure data set depicts a damage value assigned by inspection and a recorded risk index for the component at time of inspection.

19. The system of claim 15, wherein determining the remaining-useful-life distribution further comprises:
establishing the end-of-life damage threshold based at a damage level at which a likelihood of failure of each of the plurality of components of the gearbox or secondary damage to the wind turbine exceeds an acceptable limit;
determining a number of predicted cycles required to reach the end-of-life damage threshold for each sample of a sampling; and
combining, with the controller, the determined number of predicted cycles for each sample so as to produce a remaining-useful-life distribution between an upper confidence interval and a lower confidence interval defining a confidence band.

20. The system of claim 19, wherein the plurality of operations further comprise:
determining an interpolation of component cycles to a specified time interval based on a historical operations data set for the wind turbine;
forecasting the remaining-useful-life distribution relative to time via the ratio; and generating an output table, the output table indicating a probability of component failure over each of a plurality of time intervals.

* * * * *